United States Patent Office 3,523,108
Patented Aug. 4, 1970

3,523,108
PROCESS FOR DIRECT ESTERIFICATION OF BUTADIENE POLYMERS AND PRODUCT PRODUCED THEREBY
Stephen P. Boutsicaris, Akron, and Robert A. Hayes, Cuyahoga Falls, Ohio, assignors to The Firestone Tire & Rubber Company, Akron, Ohio, a corporation of Ohio
No Drawing. Filed Oct. 31, 1967, Ser. No. 679,511
Int. Cl. C08d 5/04; C08f 1/88, 27/00
U.S. Cl. 260—85.1                                                17 Claims

ABSTRACT OF THE DISCLOSURE

This invention comprises a process for directly esterifying polymers having repeating units therein derived from butadiene, including copolymers having as little as one butadiene repeating unit per polymer molecule. The esterification is effected in the presence of a mixture of sulfuric acid and saturated aliphatic or aromatic carboxylic acid, preferably acetic acid, the ratio of acetic or other carboxylic acid to sulfuric acid being in the range of 2–25 volumes of carboxylic acid per volume of sulfuric acid. The amount of said acid mixture should be in the range of 0.1 part by weight up to 25 parts by weight of acid mixture per part by weight of polymer. A solvent is advantageously used in which the starting polymer is soluble, preferred solvents being benzene, toluene and hexane, and the amount of solvent is advantageously in the range of 50 to 1,500, preferably about 100 to 1,000 parts per 100 parts by weight of starting polymer. The temperature of esterification can be from room temperature to 150° C. but is advantageously in the range of 70–100° C. preferably about 78–90° C., and a reaction time depending on the temperature used but advantageously at least 30 minutes. The nature of the product depends on the molecular weight of the starting polymer and can range from very viscous liquids to hard thermoplastic resins.

BACKGROUND OF THE INVENTION

Field of the invention

This invention relates to esterified polymers and a process for producing them from butadiene polymers.

Related prior art

Polymeric molecules having pendant ester groups attached to the linear chain have long been known. The most important of these are vinyl acetate polymers, either homopolymers or copolymers with various comonomers. The acetate group of such polymers is derived exclusively from the vinyl acetate portion of the polymer. Therefore polymers with specified acetate content could be formed only if vinyl acetate copolymerizes with an appropriate comonomer in the desired proportions. Recently certain polyvinyl ethers have been successfully converted to polyvinyl acetate, and it has been possible to esterify polymers containing alcoholic hydroxy groups.

In view of the availability of unsaturated polymers, particularly unsaturated hydrocarbon polymers, it would be desirable for economic and other reasons to produce esterified polymers from polymers having unsaturation therein.

In attempting to esterify various unsaturated polymers directly by various means the present inventors have found that certain unsaturated polymers not containing butadiene, such as natural rubber, neoprene, ethylene-propylene terpolymers, etc. were not esterified. Moreover it has been found that various materials that might be expected to promote esterification, such as aluminum chloride, boron fluoride, high concentrations of sulfuric acid, etc., do not work satisfactorily and generally cause crosslinking of the unsaturated polymers. Moreover, acetic anhydride and acetic acid by themselves do not work satisfactorily.

SUMMARY OF THE INVENTION

In accordance with the present invention, it has been found that any polymer containing butadiene repeating units can be esterified directly by using a mixture of sulfuric acid and carboxylic acid in a ratio of carboxylic acid to sulfuric acid ranging from 2/1 to 25/1 parts by volume and using such mixture in a proportion of 10 to 2500 parts, preferably 500 parts to 2500 parts by weight per 100 parts by weight of starting polymer. The foregoing proportions are based on the use of concentrated sulfuric acid having 96–98% sulfuric acid. The sulfuric acid should have a concentration of at least 90%, preferably at least 95%.

The preferred ratios of carboxylic to sulfuric acids, of acid mixture to starting polymer and of solvent to starting polymer each depend somewhat on the molecular weight of the starting polymer. For example, with lower molecular weight starting polymers the broad ranges stated above are preferred. With higher molecular weight starting polymers, such as 10,000 or higher, preferred ranges are 14–25 volumes of carboxylic acid per volume of sulfuric acid, 15–25 parts by weight of acid mixture per part by weight of polymer, and 500–1,500 parts by weight of solvent per 100 parts by weight of polymer.

The carboxylic acid is a saturated aliphatic or aromatic carboxylic acid having no more than 10 carbon atoms. Formic acid can be used but since there is some formation of carbon monoxide by reaction of the formic acid with the sulfuric acid it is necessary to use sufficient excess formic acid or to use a means to retard its reaction with sulfuric acid in order to provide sufficient formic acid for esterification.

For this reason the other carboxylic acids are preferred for the esterification, particularly acetic acid. Other preferred carboxylic acids are propionic, butyric, caproic, heptanoic, octanoic, 2-ethylhexanoic, decanoic, benzoic, toluic, phenylacetic, phenylpropionic, cyclohexylacetic acid, naphthoic, methyl naphthoic, etc. The preferred carboxylic acids have 2–10 carbon atoms.

The starting polymer is advantageously dissolved in an appropriate solvent, namely one which is capable of dissolving the butadiene polymer and which has no groups therein which interfere with the desired reaction. Preferred solvents are benzene, toluene, hexane, etc. and the solvent is advantageously used in a proportion to maintain the starting polymer in solution, preferably in a concentration of at least about 2%, advantageously about 10–40% by weight.

The butadiene polymer may have the butadiene units in the cis-1,4, the trans-1,4 or the vinyl-1,2 form or any combination or mixtures thereof. The order of esterification with the respective butadiene repeating units is in the order of cis-1,4, then vinyl-1,2 and last trans-1,4. This order is relatively but not completely selective.

While reference hereinafter is generally made to the formation of acetates, which is the preferred reaction, the statements also apply to esterification in general as related to this invention.

This invention can be practiced on a polymer having at least 1 but preferably at least 4 repeating units selected from the following group of repeating units derived from butadiene, sometimes hereinafter referred to as "butadiene repeating units":

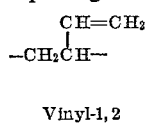  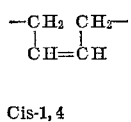  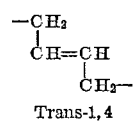

Vinyl-1,2    Cis-1,4    Trans-1,4

It has been found that esterification can be effected in polybutadiene, or a polymer having a high proportion of butadiene repeating units therein up to as much as approximately 40% of the double bonds or even higher. In polymers having low proportion of butadiene repeating units, the esterification may be effected on substantially all of the unsaturated groups therein. Apparently the insolubility produced by the attachment of the acetate groups has a bearing on the degree of esterification that can be effected.

It has been found that polymers having even less than one mole percent of butadiene therein can be esterified according to the present invention. However the reaction rate is very slow and for practical purposes it is desirable to have at least one mole percent, preferably at least 25 mole percent of butadiene in the starting polymer.

The esterified polymer product is processed to remove all traces of sulfuric acid since even traces of sulfuric acid will eventually cause crosslinking and hardening upon standing. It is found desirable also to use an antioxidant to protect against hardening. This is added toward the end of the reaction.

The esterified product is identified by infrared spectrum, which shows the presence of acetate groups, hydroxy groups, etc. In the course of final processing of the product, some of the acetate groups may be displaced by hydrolysis so that the infrared analysis shows the presence of a few hydroxy groups. The esterified product can be hydrolyzed in alcoholic KOH. For example, the acetate groups are completely removed by heating the polymer in alcoholic KOH at 90° C. for 20 hours. Subsequent infrared analysis shows that all the acetate groups have been removed and that hydroxy groups are present in their place.

A simple method for determining the percent of acetate groups in a polybutadiene can be based on the carbon analysis. This method is based on the fact that as the percentage of acetate is increased, the percentage carbon in the polymer is correspondingly decreased. Such a curve is appropriate for any polybutadiene regardless of molecular weight, and also roughly for any hydrocarbon-butadiene copolymer.

The properties of the polymers esterified by the process of this invention will vary somewhat according to the molecular weight of the starting polymer. Generally for a particular type of polymer, the higher the molecular weight of the starting polymer, the lower will be the percentage of acetate groups which will precipitate esterified polymer product from the solution. Conversely, the lower the molecular weight, the greater will be the number of unsaturated groups that can be esterified before the product will be precipitated and removed from the reaction. When the esterified product remains in solution, substantially complete esterification can be effected. For example, a polybutadiene having a molecular weight of about 200,000, prepared by lithium alkyl polymerization, which polymer is used in a number of examples given below, is esterified to give a product which is insoluble in most solvents, except strong solvents such as dimethylformamide. In contrast, a low molecular weight polybutadiene, that is one having a molecular weight of 10,000 or less, gives an acetate product that can be dissolved in tetrahydrofurane.

The properties of the esterified product can be modified by the presence of various types of comonomers in the starting polymer. Advantageously, the comonomer is one which will not be degraded by or reacted with the sulfuric acid or acetic acid used in the process. Typical comonomers that can be used are: ethylene, propylene, butylene, amylene, decylene, styrene, alphamethyl styrene, vinyl toluene, vinyl xylene, vinyl naphthalene, vinyl diphenyl, vinyl methylnaphthalene, vinyl acetate, vinyl chloride, acrylonitrile, methacrylonitrile, methyl methacrylate, ethyl acrylate, vinylidene chloride, vinylidene, cyanide, isoprene, phenyl vinyl ether, vinyl methyl phthalate, vinyl methyl maleate, vinyl butyl succinate, etc.

The extent of esterification will also depend somewhat on the polymer concentration, the solvent, the sulfuric acid concentration, the acetic acid concentration, the time of reaction, the temperature, etc. In some cases it is desirable to use a solvent having a boiling point at approximately the desired reaction temperature so that refluxing of the solvent will be a convenient means for controlling the temperature. For this reason benzene is a preferred solvent since it boils at a temperature very convenient for the purpose of this process. However solvents of lower or higher boiling points can be used with appropriate means being used for control of the temperature, such as the use of pressure in a closed reactor in the event that the solvent boils at a temperature lower than that desired for the reaction, and thermostatic control of the temperature when a solvent is used having a boiling point higher than the desired reaction temperature. Preferably the solvent has a boiling point lower than that of acetic acid so that it can be distilled off without removing acetic acid.

With regard to the comonomers used, a co-pending application Ser. No. 679,104, filed Oct. 30, 1967, discloses and claims the process of simultaneously esterifying and lactonizing copolymers of butadiene and methacrylic acid, these copolymers sometimes being designated as BD-MA.

The particular high molecular weight polymer referred to above as prepared by polymerization catalyzed by lithium alkyl, is one having its butadiene repeating units distributed as 28-30% cis-1,4, 9-10% vinyl-1,2 and about 60% trans-1,4. This polymer has a molecular weight of approximately 200,000, and the esterification of this material can be carried to a maximum of about 40% of the unsaturation. The resultant acetate is a millable thermoplastic resin soluble in toluene-DMF mixture. When hydrolyzed, it is converted to a hard, insoluble material.

The esterification reaction described herein is a cationic reaction involving the addition of the polarized acetic acid molecule to a double bond of the polymer to form pendant acetate ester groups. This reaction is represented as follows:

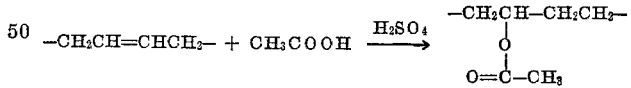

The extent of esterification is most conveniently controlled by regulating the concentration of the two acids.

The invention is best described and illustrated by the following examples. These examples are presented merely for purposes of illustration and are not intended in any way to restrict the scope of the invention nor the manner in which it can be practiced. Except where otherwise indicated, parts and percentages are given by weight.

EXAMPLE I

Into a 2-liter, 3-necked flask equipped with a stirrer, thermometer and condenser is placed a solution of 400 ml. of benzene and 10 grams of a polybutadiene prepared by polymerization of butadiene with butyllithium, the polymer having a molecular weight of about 200,000 and an unsaturation distribution of 28–30% in the cis-1,4 form, 9–10% in the vinyl-1,2 and 60% in the trans-1,4 form. Then 10 ml. of concentrated sulfuric acid (96%) in 170 ml. of glacial acetic acid is added and the mixture refluxed at 80° C. for two hours under vigorous stirring, following which 0.2 gram of a phenolic antioxidant is added. Then the reaction mass is cooled to 50° C. and the thermometer is replaced by a steam inlet. Forty grams of NaOH pellets are added and the dark brown solution is stirred for 5 minutes, following which steam distillation is conducted with vigorous stirring until all of the benzene is removed. The NaOH neutralizes all traces of sulfuric acid which would otherwise cause crosslinking and hardening of the polymer. Then the light brown resin product is filtered, washed on the filter with a large excess of hot water, placed on a mill and washed simultaneously with milling, stirred in a Waring Blendor with methanol and then air dried. This product is soluble in a mixture of toluene-DMF and is identified by infrared spectrum, carbon and hydrogen analyses as having 24% acetate content, i.e., 24% of its double bonds have been saturated with acetate groups. The toluene-DMF solvent in this case is 70% DMF by volume and 30% toluene. Generally for this purpose the concentration can vary from 30% to 60% by volume of DMF.

EXAMPLE II

A series of esterifications are performed, using the procedure of Example I, to show the effect of variations in the concentration of sulfuric acid. The esterifications are conducted at 90° C. for 1½ hours using 500 ml. of toluene, 140 ml. of acetic acid and 10 grams of the polybutadiene used in Example I. The acetate contents of the products are calculated from their carbon and hydrogen analyses and the results are tabulated below.

|  | A | B | C |
|---|---|---|---|
| Sulfuric acid used, ml. | 7 | 9 | 11 |
| Analysis of product, percent C | 81.42 | 79.60 | 77.69 |
| Analysis of product, percent H | 10.26 | 10.18 | 9.94 |
| Calculated: Mole percent—Acetate | 16.2 | 21.0 | 26.7 |

The results show that within the range tested, the percent esterification increases with the increased amount of sulfuric acid used.

EXAMPLE III

The procedure of Example II is repeated in a series of experiments in which the amount of sulfuric acid used is held constant at 9 ml. and varying amounts of acetic acid are used. The results tabulated below show that, within the range of these tests, the percent esterification increases with the amount of acetic acid used.

|  | E | F | G |
|---|---|---|---|
| Acetic acid used, ml. | 90 | 135 | 180 |
| AcOH/H$_2$SO$_4$ volume ratio | 10 | 15 | 20 |
| Acetate in product, mole percent | 19.5 | 21.0 | 22.0 |

From these and other tests it has been found that the solubility of the products derived from this particular starting polymer depends mainly on the acetic acid/sulfuric acid ratio, which actually represents the dilution of sulfuric acid in acetic acid. In tests with an AcOH/H$_2$SO$_4$ volume ratio less than 8, the solution always gels during the reaction regardless of the amount of sulfuric acid present. This is apparently because of cyclization or crosslinking of the polybutadiene. For some reason runs with AcOH/H$_2$SO$_4$ ratios from 8 to 12 yield products which are soluble during the reaction but become insoluble after a few days storage. It is noted that the highly esterified products are more soluble in dimethylformamide than in toluene.

The infrared spectra of the products are used as the main means for identification. By this means, the relative amount of acetate formation is determined by the size of absorption bands with peaks at 1745 cm.$^{-1}$ and 1240 cm.$^{-1}$. The infrared spectra of the acetates also show that the cis-1,4 form of unsaturation is esterified first, followed by the vinyl-1,2 and then by the trans-1,4. The content of acetate groups in each product calculated according to the carbon and hydrogen analyses is corroborated by the infrared spectra analyses.

EXAMPLE IV

The procedure of Example I is repeated a number of times using 10 grams of polybutadiene and varying the volume of 96% H$_2$SO$_4$ and the acetic acid as indicated in the table immediately below. The results show that if insufficient acetic acid is used the product gels or becomes insoluble.

| Volume Ratio of AcOH to H$_2$SO$_4$ | Ccs. of H$_2$SO$_4$ used per gram of Polybutadiene | | | | | | | |
|---|---|---|---|---|---|---|---|---|
|  | 0.3 | 0.5 | 0.9 | 1.1 | 1.3 | 1.5 | 1.8 | 2.0 |
|  | Mole Percent Acetate Content of Product | | | | | | | |
| 5.0 | Gelled | | | | | | | |
| 8.0 | Insoluble | | | | | | | |
| 10.0 | 7.2 | 19.5 | | | | | | |
| 12.0 | | | | | | | | |
| 14.0 | | | | 20.7 | 22.2 | 26.2 | | |
| 15.0 | | | 21.0 | | | 28.0 | 32.9 | 37.6 |
| 17.0 | | | | | | 32.0 | 22.5 | |
| 20.0 | 7.0 | 18.6 | 22.0 | 27.2 | | | | |

EXAMPLE V

The procedure of Example I is repeated a number of times using 200 ml. (instead of 170 ml.) of acetic acid with a variety of unsaturated polymers. The results are tabulated below:

| Unsaturated polymer | Percent butadiene | Acetate content |
|---|---|---|
| Polybutadiene (control) | 100 | 39%. |
| Stereon-720 [1] | 90 | Large amount of acetate groups. |
| Stereon-700 [2] | 80 | Both ester peaks, 1,240 and 1,745 shown. OH is also found. |
| FRS-1006 [3] | 76.5 | Peak 1,695 shifted to 1,745. Large 1240 band. Cis-1,4 reacts first. |
| FRN-600 [4] | 70 | Both peaks, 1,240 and 1,745, shown. Vinyl-1,2 reacts first. Also an NH$_2$ band is shown at 1,670 cm.$^{-1}$. |
| Natural Rubber | 0 | None. |
| EPT Rubber [5] | 0 | Do. |
| Neoprene Rubber | 0 | Do. |

[1] 90% butadiene, 10% styrene.
[2] 80% butadiene, 20% stryene.
[3] 76.5% butadiene, 23.5% styrene.
[4] 70% butadiene, 30% acrylonitrile.
[5] Ethylene-propylene-1,5-hexadiene.

EXAMPLE VI

A solution of 100 grams of low molecular weight polybutadiene (mol. wt. 5,500) dissolved in 400 ml. of benzene, is treated with a mixture of 10 ml. of 96% sulfuric acid and 200 ml. of glacial acetic acid. This is stirred under reflux at 86° C. for two hours. At the end of this time, the dark reaction mixture is cooled to 75° C. and two grams of a phenolic antioxidant in 5 ml. of benzene is added to the mixture. Stirring is continued until the temperature reaches 50° C. Then 15 grams of NaOH pellets are added and the mixture stirred under low vacuum until about one-half of the benzene has been distilled off. This is followed by steam distillation to complete the removal of the solvent. The resultant dark, amber-colored lumps are filtered, washed with water on the filter, stirred with 400 ml. of 5% sodium bicarbonate solution, washed again with water, and finally dried in a vacuum oven at 25° C. for two days. The resinous product is soluble in tetrahydrofurane, toluene and chloroform and is insoluble in water, methanol and acetone. It has an inherent viscosity of 0.30 in cyclohexanone and has an acetate content of 17.0%.

EXAMPLE VII

The procedure of Example VI is repeated using 200 ml. of benzene, 5 ml. of sulfuric acid and 100 ml. of acetic acid instead of the amounts used in Example VI. The product has an acetate content of 4.7%.

EXAMPLE VIII

The procedure of Example VI is repeated using 50 ml. of sulfuric acid, 1,000 ml. of acetic acid, a reaction temperature of 90° C., a reaction period of 1¾ hours and 150 grams of NaOH instead of the corresponding amounts and reaction conditions of Example VI. The acetate content of the product is 30.6%.

EXAMPLE IX

The procedure of Example VI is repeated using 100 grams of a polybutadiene having a molecular weight of 3,485, 200 ml. of benzene, 200 ml. of acetic acid, 10 ml. of sulfuric acid, a reaction period of two hours at 87° C., and 30 grams of NaOH. The acetate content of the product is 17.2%.

EXAMPLE X

The procedure of Example I is repeated a number of times using individually a number of butadiene copolymers containing respectively the following amounts of comonomer, the remainder being butadiene:

(a) 5 mole percent propylene;
(b) 25 mole percent vinyl toluene;
(c) 20 mole percent vinyl naphthalene;
(d) 30 mole percent acrylonitrile; and
(e) 50 mole percent methyl methacrylate.

In each case, the copolymer is esterified.

In addition to the various solvents shown in the examples various other solvents can be used preferably hydrocarbon solvents which have the appropriate solvent power for the starting polymer and for retaining the esterified product until it has received a substantial number of acetate radicals. Such other solvents include aliphatic, aromatic and cycloaliphatic hydrocarbons such as hexane, heptane, octane, decane, dodecane, cyclohexane, cycloheptane, methyl cycloheptane, methylcyclohexane, toluene, benzene, xylene, ethylbenzene, etc.

As previously indicated the starting diene polymers can be of various molecular weights, with or without the various comonomers indicated. Advantageously, the molecular weights are in the range of 500 to 500,000. For most purposes it is desirable to have at least 5 percent by weight of acetate groups in the esterified polymer product.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of esterifying a 1,3-butadiene polymer having a molecular weight of 500–500,000 and having repeating units selected from the class consisting of vinyl-1,2, cis-1,4, and trans-1,4 comprising the steps of:

(a) treating a solution of said polymer at a temperature from room temperature to 150° C. with a mixture of sulfuric acid of at least 90% concentration and a carboxylic acid having no more than 10 carbon atoms selected from the class consisting of saturated aliphatic and aromatic carboxylic acids, the proportions of said mixture being 2–25 volumes of said carboxylic acid per volume of concentrated sulfuric acid and said acid mixture being used in a proportion of 0.1–25 parts by weight per part by weight of said polymer, said treatment being continued for a period of at least 5 minutes; and (b) recovering the esterified product from said reaction mass.

2. The process of claim 1 in which said sulfuric acid has a concentration of at least 95 percent by weight.

3. The process of claim 1 in which said carboxylic acid is acetic acid.

4. The process of claim 1 in which the treatment is effected at a temperature of at least room temperature and below 150° C.

5. The process of claim 1 in which said sulfuric acid has a concentration of at least 95 percent by weight and the treatment is effected at a temperature in the range of 70–100° C.

6. The process of claim 5 in which the treatment is effected for a period of at least 30 minutes.

7. The process of claim 6 in which the carboxylic acid is acetic acid.

8. The process of claim 7 in which said polymer has a molecular weight of at least 10,000, said acid mixture has 14–25 volumes of acetic acid per volume of sulfuric acid and said acid mixture is used in a proportion of 15–25 parts by weight per part by weight of polymer.

9. The process of claim 8 in which said temperature is in the range of 78–90° C.

10. The process of claim 9 in which said solution of polymer is a solution in benzene.

11. The process of claim 10 in which said polymer is a homopolymer of 1,3-butadiene.

12. The process of claim 10 in which said polymer is a lithium alkyl catalyzed homopolymer of 1,3-butadiene.

13. The process of claim 12 in which said polymer has a molecular weight of about 200,000.

14. The process of claim 13 in which said reaction is continued for a period of at least 60 minutes.

15. The process of claim 10 in which said polymer is a copolymer of butadiene and styrene.

16. The process of claim 10 in which the esterified product is recovered by first neutralizing the sulfuric acid, then distilling the solvent from the esterified product.

17. The process of claim 3 in which the reaction mass is processed by neutralization of the sulfuric acid with approximately a stoichiometric amount of sodium hydroxide, followed by steam distillation for removal of the solvent, the esterified polymer product recovered thereby being recovered by filtration and washed with water for removal of acid residue.

References Cited

UNITED STATES PATENTS

| | | | |
|---|---|---|---|
| 1,365,052 | 1/1921 | Ellis et al. | 260—497 XR |
| 1,877,291 | 9/1932 | Frolich et al. | 260—497 XR |
| 2,678,332 | 5/1954 | Cottle | 260—497 XR |
| 3,299,032 | 1/1967 | Rollmann | 260—94.7 |
| 3,402,136 | 9/1968 | Sakuragi | 260—94.7 XR |

OTHER REFERENCES

Synthetic Organic Chemistry by Wagner and Zook, p. 491.

JOSEPH L. SCHOFER, Primary Examiner

W. F. HAMROCK, Assistant Examiner

U.S. Cl. X.R.

260—80.3, 82.1, 83.3, 83.5, 85.3, 87.5, 87.7, 87.9, 88.2, 94.7, 497

PO-1050
(5/69)

UNITED STATES PATENT OFFICE
CERTIFICATE OF CORRECTION

Patent No. 3,523,108      Dated August 4, 1970

Inventor(s)    Stephen P. Boutsicaris and Robert A. Hayes

It is certified that error appears in the above-identified patent and that said Letters Patent are hereby corrected as shown below:

Col. 6, line 2, "Eyample" should read --Example-- line 18, "22.5" should read --33.5--

Signed and sealed this 11th day of January 1972.

(SEAL)
Attest:

EDWARD M. FLETCHER, JR.
Attesting Officer

ROBERT GOTTSCHALK
Acting Commissioner of Patents